E. BROWN.
TOOTHED WHEEL GEARING.
APPLICATION FILED JUNE 15, 1920.

1,358,615.

Patented Nov. 9, 1920.

Inventor
E. Brown
By L. R. Kerslake
Atty.

UNITED STATES PATENT OFFICE.

ERIC BROWN, OF BADEN, SWITZERLAND, ASSIGNOR TO AKTIENGESELLSCHAFT BROWN BOVERI & CIE., OF BADEN, SWITZERLAND.

TOOTHED-WHEEL GEARING.

1,358,615.     Specification of Letters Patent.     Patented Nov. 9, 1920.

Application filed June 15, 1920. Serial No. 389,227.

*To all whom it may concern:*

Be it known that I, ERIC BROWN, a subject of the King of Great Britain and Ireland, residing at No. 8 Bahnhofweg, Baden, Switzerland, have invented certain new and useful Improvements in Toothed-Wheel Gearing, of which the following is a specification.

This invention relates to toothed wheel gearing with any desired position of the teeth wherein a driving wheel serves to drive simultaneously a plurality of wheels. The most frequent case of this kind is the one wherein such a wheel has two points of engagement. For the sake of simplicity this case will be taken as the basis of the following description.

The object of the invention is to furnish gearing of the above type in which the teeth of the driving gear will bear equally on the driven gears and will accommodate themselves to variations in the positions of the driven gear teeth.

In the accompanying drawings Figure 1 is a diagrammatic view illustrating the principle of the invention.

Figure 1:
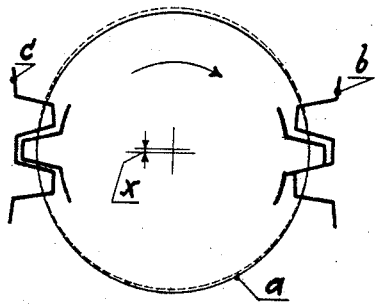

In Fig. 1 of the accompanying drawings, $a$ is a pinion driving for instance the wheels $b$ and $c$ (merely indicated) which serve to transmit the power received from the pinion to other shafts with or without interposed speeding-up or speeding-down gears. The greater the number of points of engagement, especially for instance in a closed system, that is to say, with a power cycle, the greater will be the difficulty to get the flanks of the teeth at all points of engagement to bear intimately and to get the said teeth to take their share of the transmitted power. For instance, especially in the case of pinions, it may easily happen that the teeth of pinion $a$ and wheel $b$ will bear against one another at a determined instant of time, whereas the teeth of pinion $a$ and wheel $c$ will not be bearing at the same time. A position of this kind is illustrated for instance in Fig. 1.

The transmission of the power is therefore effected only at one side of the gear, that is to say, the whole of the power is thrown on to wheel $b$, with the result that in working, in addition to other drawbacks, such as shocks, irregular running, disturbing noises, it may happen that the teeth and the bearings are subjected to sudden unpermissible strains.

According to the present invention these drawbacks are obviated by mounting the shaft of the driving wheel $a$ elastically, and locating the bearing of the said shaft at such a distance away from the wheel that the pinion is not prevented from bringing the flanks of the wheel into the best position for engagement and thus distributing the tooth pressure.

Figure 2:
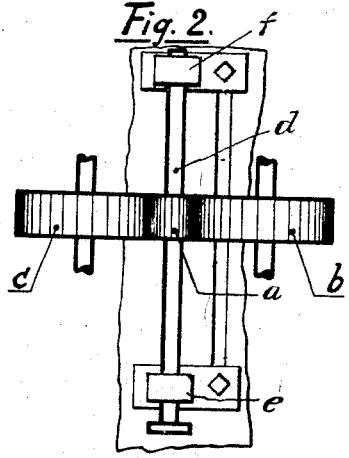
Fig. 2 is a plan view of a simple form of the invention.

Fig. 2 is a plan of the most simple example of the application of this invention, namely, the simultaneous driving of two spur wheels $b$ $c$ by a wheel or pinion $a$ meshing with both said spur wheels. The pinion $a$ is fixed on the elastic shaft $d$ which is mounted in bearings at $e$ on one side of the wheel and at $f$ on the other side of the wheel. The manner of operation of the flexible shaft will be clearly understood in view of the foregoing preamble and of Fig. 1 of the drawings without further description.

If the tooth flanks should not be bearing against one another at one of the points of engagement, the pinion $a$ will be enabled by the elasticity of its shaft to adjust itself to the correct position by the action of the torque which is exerted for instance by the driving engine. The second position (given by way of example) of the pinion $a$ is indicated in dotted lines in Fig. 1. The extent $x$ of the shifting of the central axis is very small, because it is only half of that at the point of engagement of the teeth.

Figure 3:
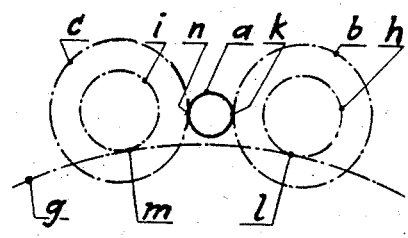
Figs. 3 and 4 are respectively an elevation and a plan view of the application of this invention to a multiple-step helical tooth wheel gearing.
Figure 4:
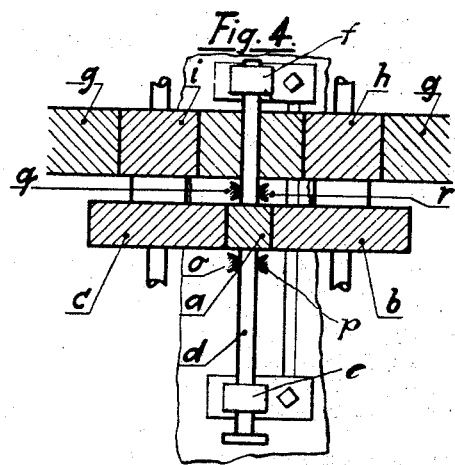

In Figs. 3 and 4 is illustrated the application of this invention to a multiple-step helical tooth wheel gearing with drive of the last wheel $g$ through the wheels $h$ and $i$ that are fixed on the same shaft as the wheels $b$ and $c$. The wheels of this multiple-step helical wheel gear constitute a closed system, that is to say, a power cycle owing to the interlinking of the points of engagement $k\ l\ m\ n$ of the teeth (Fig. 3). The power cycle thus begins at wheel $a$ and ends at the same point. In gears of this kind the use of this invention is particularly advantageous, because the adjustment of all four points of engagement of the teeth is very difficult from the very beginning. It is easy to make the teeth bear at three points of engagement, and the difficulty at the fourth point is overcome by the provision of a flexible shaft according to this invention. Lateral stops $o\ p\ q\ r$ serve to prevent the shaft from bending and thereby causing a shifting of the pinion $a$ relatively to the center of the wheels $b\ c$ driven by it. In order to enable the critical angular speed of the flexible shaft of the driving wheel to be controlled, the bearings are made slidable in the direction of the longitudinal axis of the said shaft.

Figure 5:
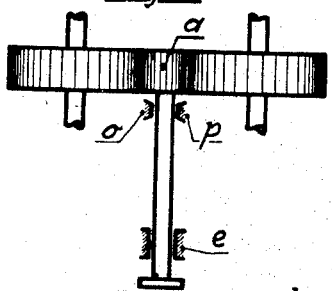
Figs. 5 and 6 illustrate the application of the present improvements to pinions mounted in bearings on one side only.
Figure 6:
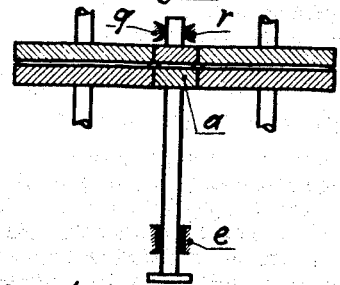

Figs. 5 and 6 illustrate the application of the present improvements (hitherto illustrated in respective pinions mounted in bearings on both sides) to pinions mounted in bearings on one side only, that is to say, overhung pinions with the difference that in the one case (Fig. 5) the lateral limiting devices are located only on the hither side of the pinion $a$ relatively to the bearing side, and in the other case (Fig. 6) only on the farther side of the pinion $a$ relatively to the bearing side. There is however no objection to providing such limiting devices on both sides of the pinion in the case of overhung pinions.

Figure 7:
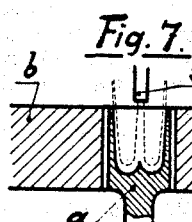
Fig. 7 is a longitudinal section through the pinions.

In a construction as shown in Fig. 5, it is advisable to make the overhung pinion $a$ of hollow bell shape (Fig. 7) in order to provide a pinion that shall be as light as possible, and thereby have the smallest possible movable mass at the free end of the shaft. This construction requires a good cooling arrangement which, in the case of a pinion of this kind, can be readily effected by means of oil in the manner shown in Fig. 7, this oil being introduced under pressure at $s$, and then reversing the direction of its flow, so as to pass along the inner wall of the pinion, to its outlet.

It is immaterial to the invention whether spur wheels, helical wheels or inclined-tooth wheels, etc., are employed.

What I claim is:—

1. In a toothed wheel gear the combination with a plurality of driven toothed wheels, of a common driving toothed wheel meshing with said plurality of driven toothed wheels, an inherently resilient shaft carrying said common driving toothed wheel, and a bearing for said shaft located comparatively remotely from said common driving toothed wheel, whereby said driving toothed wheel has complete freedom for the flanks of its teeth to take up the best position for meshing simultaneously with uniform distribution of the tooth pressure at all points of engagement.

2. In a toothed wheel gear the combination with a plurality of driven toothed wheels, of a common driving toothed wheel meshing with said plurality of driven toothed wheels, an inherently resilient shaft carrying said common driving toothed wheel, and a bearing for said shaft located comparatively remotely from said common driving toothed wheel, whereby said driving toothed wheel has complete freedom for the flanks of its teeth to take up the best position for meshing simultaneously with uniform distribution of the tooth pressure at all points of engagement, and means for guiding said driving toothed wheel in such a manner as to allow said flexible shaft to yield only in a determined direction.

3. In a toothed wheel gear the combination with a plurality of driven toothed wheels, of a common driving toothed wheel meshing with said plurality of driven toothed wheels, an elastic shaft carrying said common driving toothed wheel, and bearings for said elastic shaft located comparatively far apart, one of said bearings being slidable along said flexible shaft for the purpose of enabling the critical angular velocity of said flexible shaft to be controlled, whereby said driving toothed wheel has complete freedom for the flanks of its teeth to take up the best position for meshing simultaneously with uniform distribution of the tooth pressure at all points of engagement.

4. In a toothed wheel gear the combination with a plurality of driven toothed wheels, of a common driving toothed wheel meshing with said plurality of driven toothed wheels, an elastic shaft carrying said common driving toothed wheel, and bearings for said elastic shaft located comparatively far apart, one of said bearings being slidable along said flexible shaft for the purpose of enabling the critical angular velocity of said flexible shaft to be controlled, whereby said driving toothed wheel has complete freedom for the flanks of its teeth to take up the best position for meshing simultaneously with uniform distribution of the tooth pressure at all points of engagement, and means for guiding said driving toothed wheel in such a manner as to allow said flexible shaft to yield only in a determined direction.

In testimony whereof I have signed my name to this specification.

ERIC BROWN.